United States Patent
Massie et al.

(10) Patent No.: US 12,015,868 B2
(45) Date of Patent: Jun. 18, 2024

(54) ITEM OF OPTRONIC EQUIPMENT FOR ASSISTING WITH PILOTING AN AIRCRAFT

(71) Applicant: SAFRAN ELECTRONICS & DEFENSE, Paris (FR)

(72) Inventors: Louis Massie, Paris (FR); Emmanuel Kling, Paris (FR); Michel Vaissiere, Paris (FR); Thomas Devichi, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 5 days.

(21) Appl. No.: 17/274,716

(22) PCT Filed: Sep. 10, 2019

(86) PCT No.: PCT/EP2019/074137
§ 371 (c)(1),
(2) Date: Mar. 9, 2021

(87) PCT Pub. No.: WO2020/053227
PCT Pub. Date: Mar. 19, 2020

(65) Prior Publication Data
US 2022/0021820 A1    Jan. 20, 2022

(30) Foreign Application Priority Data
Sep. 10, 2018 (FR) ..................... 18 00948

(51) Int. Cl.
*H04N 5/265* (2006.01)
*B64D 47/00* (2006.01)
*H04N 23/90* (2023.01)

(52) U.S. Cl.
CPC ............ *H04N 5/265* (2013.01); *B64D 47/00* (2013.01); *H04N 23/90* (2023.01)

(58) Field of Classification Search
CPC ........ B64D 43/00; B64D 47/00; B64D 47/08; H04N 13/117; G06T 17/00; G06T 2200/08; G06T 2207/10012; G06T 2207/20081
USPC ........................................... 348/38
See application file for complete search history.

(56) References Cited

U.S. PATENT DOCUMENTS

| | | | |
|---|---|---|---|
| 10,602,126 B2 * | 3/2020 | Rowell | H04N 9/8715 |
| 2004/0169663 A1 * | 9/2004 | Bernier | G06T 15/04 |
| | | | 345/629 |
| 2008/0143842 A1 * | 6/2008 | Gillard | H04N 5/23238 |
| | | | 348/E7.086 |
| 2011/0234640 A1 | 9/2011 | Ishida | |
| 2014/0132804 A1 | 5/2014 | Guissin et al. | |

(Continued)

FOREIGN PATENT DOCUMENTS

JP    2013187782 A    9/2013

*Primary Examiner* — Masum Billah
(74) *Attorney, Agent, or Firm* — MUNCY, GEISSLER, OLDS & LOWE, P.C.

(57) ABSTRACT

Optronic equipment for assisting with piloting an aircraft includes a first set of three cameras arranged on the aircraft to generate a panoramic strip from data transmitted by the three cameras of the first set and a second set of three cameras arranged on the aircraft to generate a panoramic strip from data transmitted by the three cameras of the second set, at least one of the cameras that occupies an extreme position on the aircraft relative to the cameras of the first and second sets being arranged so as to have a field of view that is greater horizontally than vertically.

16 Claims, 3 Drawing Sheets

(56) References Cited

U.S. PATENT DOCUMENTS

| | | | |
|---|---|---|---|
| 2014/0327733 A1* | 11/2014 | Wagreich | H04N 7/185 |
| | | | 348/37 |
| 2016/0005319 A1 | 1/2016 | Cros | |
| 2016/0088280 A1* | 3/2016 | Sadi | H04N 13/194 |
| | | | 348/48 |
| 2017/0069069 A1* | 3/2017 | Winzell | G06T 5/008 |
| 2018/0020204 A1* | 1/2018 | Pang | H04N 23/90 |

* cited by examiner

ITEM OF OPTRONIC EQUIPMENT FOR ASSISTING WITH PILOTING AN AIRCRAFT

The invention relates to optronic equipment for assisting with piloting an aircraft.

TECHNOLOGICAL BACKGROUND OF THE INVENTION

In the military field, forward-looking infrared (FLIR) systems are known for assisting with piloting an aircraft. Such systems usually include a long waveband infrared (LWIR) camera connected to the pilot's helmet so that a video stream derived from data supplied by the camera is projected onto its visor, thereby providing the pilot with guidance at night or in difficult environmental conditions.

Systems are known in particular in which the camera is steerable in elevation and in bearing, with the direction in which the camera is pointing being servocontrolled on the direction in which the pilot's helmet is facing so that the video stream that is projected onto the visor of the helmet is linked to the direction in which the helmet is facing.

However, such a system requires sophisticated servocontrol to be installed between the helmet and the camera.

As a result, about ten years ago, another type of architecture emerged that is known as a "distributed aperture system": the system for assisting with piloting includes a plurality of infrared cameras distributed over the front of the aircraft and having respective fields of view that interfere in such a manner that a panoramic strip can be generated from the data supplied by the various cameras.

Thereafter, a view corresponding to the direction in which the pilot's helmet is facing is extracted from the strip in order to project the corresponding view onto the visor of the helmet, thereby artificially recreating a steerable camera that is servocontrolled on the direction in which the helmet is facing.

Such a system thus makes it possible to dispense with complicated camera/helmet servocontrol, and it is also multi-user. Specifically, it is possible to extract as many independent views from the panoramic strip as there are users.

The difficulty with that system lies in creating a panoramic strip of large size without substantial defects. At present, use is therefore made of a large number of cameras and/or of cameras that are heavy and expensive.

OBJECT OF THE INVENTION

An object of the invention is to propose optronic equipment for assisting with piloting an aircraft and based on a distributed aperture system that is simplified.

BRIEF DESCRIPTION OF THE INVENTION

In order to achieve this object, there is provided optronic equipment for assisting with piloting an aircraft, the equipment including a first set of three cameras arranged on the aircraft to generate a panoramic strip from data transmitted by the three cameras of the first set and a second set of three cameras arranged on the aircraft to generate a panoramic strip from data transmitted by the three cameras of the second set, at least one of the cameras that occupies an extreme position on the aircraft relative to the cameras of the first and second sets being arranged so as to have a field of view that is greater horizontally than vertically.

As a result, by suitably turning at least one of the outer cameras relative to the other cameras, it is possible to increase the field of view of the panoramic strip in bearing without that requiring the number of cameras to be increased, and to do so while retaining a field of view in the center of the strip that is large vertically.

This makes it possible to limit the weight and the size of the optronic equipment.

Optionally, only two cameras of the six cameras in the two sets are arranged so as to have a field of view that is greater horizontally than vertically.

Under such circumstances, said two cameras are optionally the cameras bracketing the other four cameras.

Optionally, at least two contiguous cameras are arranged in a concave configuration.

Optionally, the two cameras arranged at the center of the six cameras are crossed so that a first camera of the first set and a first camera of the second set are arranged in a concave configuration and so that a second camera of the first set and a second camera of the second set are also arranged in a concave configuration.

Optionally, two cameras belonging to respective different sets are offset relative to each other in elevation.

Optionally, the two sets are arranged in such a manner that the strips overlap, at least in part.

Then advantageously, the equipment comprises an electronic processor unit connected to the cameras and arranged to display the two image strips in stereoscopic manner and/or to form at least one wide-field image from the two image strips.

Optionally, the cameras of the first set are powered by a first power supply, and the cameras of the second set are powered by a second power supply that is independent of the first power supply.

Optionally, the equipment includes at least one block in which the cameras are arranged.

Optionally, the cameras operate in the infrared range.

Optionally, the cameras are of the LWIR type.

Optionally, the cameras are not cooled.

Preferably, the equipment comprises a processor unit connected to the cameras and to a helmet fitted with a device for displaying an image visible to the eyes of the pilot wearing the helmet.

BRIEF DESCRIPTION OF THE DRAWINGS

The invention can be better understood in the light of the following description of a particular nonlimiting embodiment of the invention given with reference to the accompanying figures, in which.

DETAILED DESCRIPTION OF THE INVENTION

Figure 1:
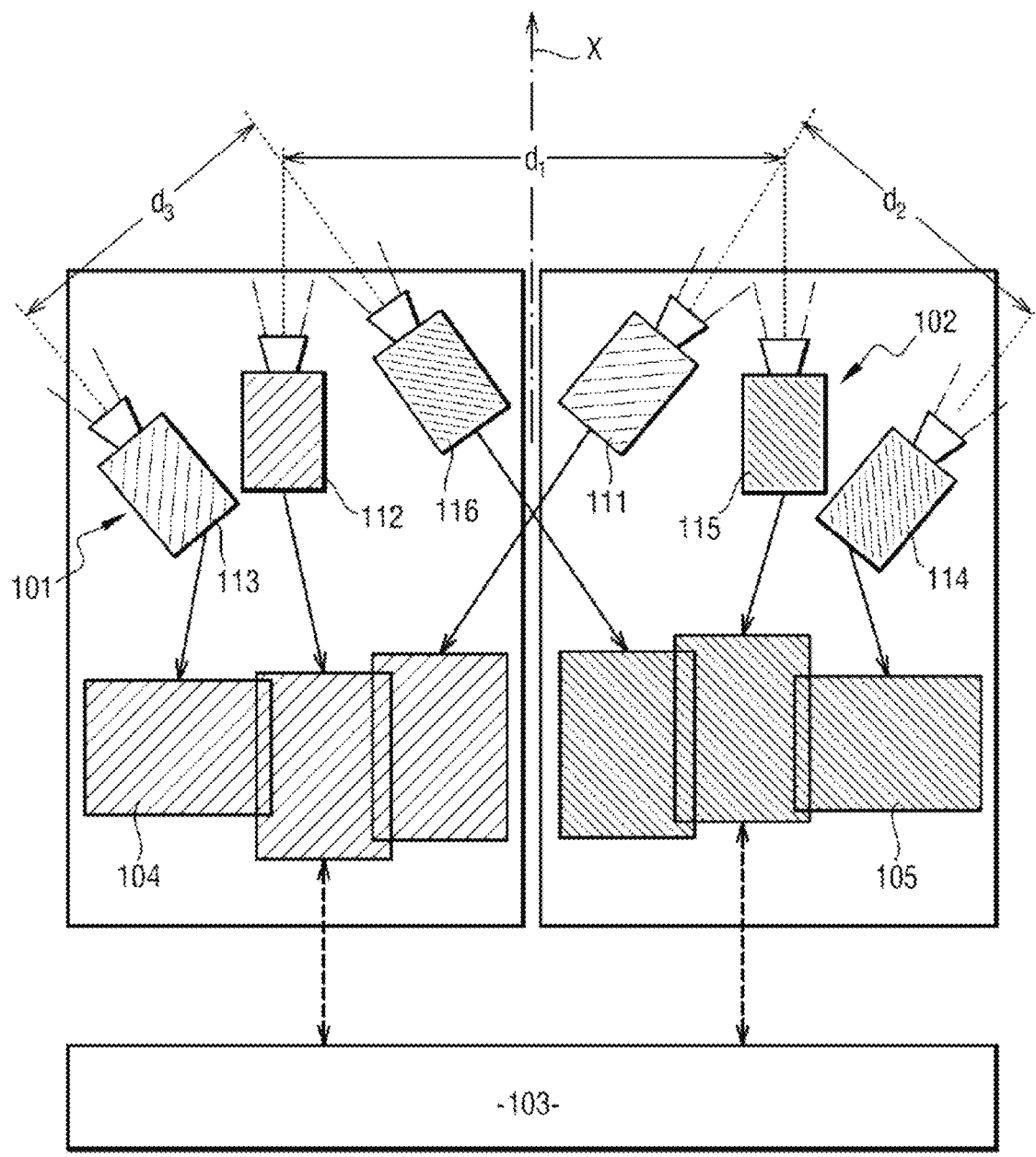
FIG. 1 is a diagram of optronic equipment in a particular embodiment of the invention.

With reference to FIG. 1, optronic equipment for assisting with piloting an aircraft in a first embodiment of the invention comprises both a first set 101 of three cameras 111, 112, and 113 arranged on the aircraft, and also a second set 102 of three cameras 114, 115, and 116 arranged on the aircraft. Each set has exactly three cameras, so that the equipment has exactly six cameras.

It should be observed that the cameras are mounted on the aircraft without having recourse to a turret.

By way of example, the cameras may be mounted independently on the aircraft, or on the contrary, the equipment may comprise both a first block having three cameras arranged therein and also a second block having the other three cameras arranged therein, thereby enabling three cameras to be mounted on the aircraft all at once in a single step. In a variant, the equipment has a single block in which the various cameras of both sets are arranged, thereby enabling the six cameras to be mounted on the aircraft all at once in a single step. The cameras are stationary relative to the aircraft.

The cameras are typically mounted at the front of the aircraft at its nose. In this example, three cameras are situated on the right of the nose of the aircraft and three cameras are situated on the left of its nose.

Preferably, the cameras 111, 112, and 113 of the first set 101 are powered by a first power supply, and the cameras 114, 115, and 116 of the second set 102 are powered by a second power supply that is independent of the first power supply. As a result, loss of one of the power supplies enables the set that is powered by the other one of the two power supplies to be conserved.

The first set 101 comprises a first camera 111, a second camera 112, and a third camera 113, and the second set 102 comprises a fourth camera 114, a fifth camera 115, and a sixth camera 116. In this example, all six cameras are identical.

By way of example, the six cameras are infrared cameras. The six cameras are preferably of the LWIR type. This makes it possible to work in the LWIR band, which gives better results in the event of degraded flying conditions (night, storm, fog, Also preferably, all six cameras are not cooled. This makes it possible to have cameras that are less expensive and more robust.

In particular manner, each of the first and second cameras 111 and 112 is arranged in such a manner as to present a field of view that is greater vertically (in elevation) than horizontally (in bearing), while the third camera 113 that occupies an extreme lateral position relative to the first and second cameras 111 and 112 is arranged so as to have a field of view that is greater horizontally than vertically.

In symmetrical manner, each of the fifth and sixth cameras 115 and 116 is arranged to have a field of view that is greater vertically than horizontally, while the fourth camera 114, that occupies an extreme lateral position relative to the fifth and sixth cameras 115 and 116, is arranged in such a manner as to have a field of view that is greater horizontally than vertically.

The third camera 113 and the fourth camera 114 are arranged as far out as possible relative to the other four cameras and relative to the longitudinal axis X of the aircraft, i.e. as far away as possible from the longitudinal axis X of the aircraft. The third camera 113 and the fourth camera 114 thus "bracket" the other four cameras (i.e. they have the other four cameras lying between them).

In the present example, and as seen from the pilot's position, the third camera 113 is on the left of the longitudinal axis X of the aircraft and the fourth camera 114 is on the right.

As a result, by turning the third and fourth cameras 113 and 114 through 90° about their lines of sight relative to the other four cameras, it is very simple to increase the field of view horizontally (i.e. in bearing) of the corresponding panoramic strips that are described below, with this applying to lateral vision while conserving a large amount elevation for front vision.

In order to further improve the dimensions of the panoramic strips, one of the three camera in each set 101, 102 is a front camera (for front vision), while the other two cameras are lateral cameras (for side vision). Each set thus has one camera substantially in alignment with the longitudinal axis X of the aircraft together with two cameras that are inclined relative to that axis.

Preferably, the projection of the line of sight of the front camera onto the horizontal plane of the aircraft is parallel to the longitudinal axis X of the aircraft. The lines of sight of the lateral cameras are inclined relative to the longitudinal axis X of the aircraft.

In order to further improve the dimensions of the panoramic strips, the two lateral cameras in each respective set point in such a manner that their respective lines of sight are inclined relative to each other. One of the lateral cameras of each set thus has its line of sight pointing to the right, and the other lateral camera of the same set has its line of sight pointing to the left, thereby providing vision on both of the right and left sides of the aircraft.

Typically the second camera 112 and the fifth camera 115 are front cameras and the other four cameras 111, 113, 114, and 116 are lateral cameras.

Preferably, in order to limit blind zones in the panoramic strip, the three cameras 111, 112, and 113 of the first set 101 are arranged in such a manner that their various fields of view overlap in part, at least at infinity. Preferably, these overlap zones occupy at least 1° to 5° horizontally, and the overlap zones may differ for different zones of the first strip.

In the same manner, the three cameras 114, 115, and 116 of the second set 102 are arranged so that their various fields of view overlap in part, at least at infinity. Preferably, these overlap zones occupy at least 1° to 5° horizontally, and the overlap zones may differ for different zones of the second strip.

Preferably, each of the front cameras 112, 115 of the two sets is arranged in a concave configuration relative to at least one of the lateral cameras of the equipment that is contiguous therewith.

This serves to further limit any risk of a blind zone, i.e. a zone that is not covered by the panoramic strips, in particular for short-distance vision.

In the present example, the two centrally-arranged lateral cameras are crossed so that the first camera 111 of the first set 101 is associated with the fifth camera 115 of the second set 102 (a front camera), and so that the sixth camera 116 of the second set 102 is associated with the second camera 112 of the first set 101 (also a front camera).

Typically, the first camera 111 is contiguous with the fifth camera 115 and points towards the fifth camera 115. In symmetrical manner, the sixth camera 116 is contiguous with the second camera 112 and points towards the second camera 112.

Thus, the line of sight of the first camera 111 points towards the line of sight of the fifth camera 115, and the line of sight of the sixth camera 116 points towards the line of sight of the second camera 112.

Figure 4:
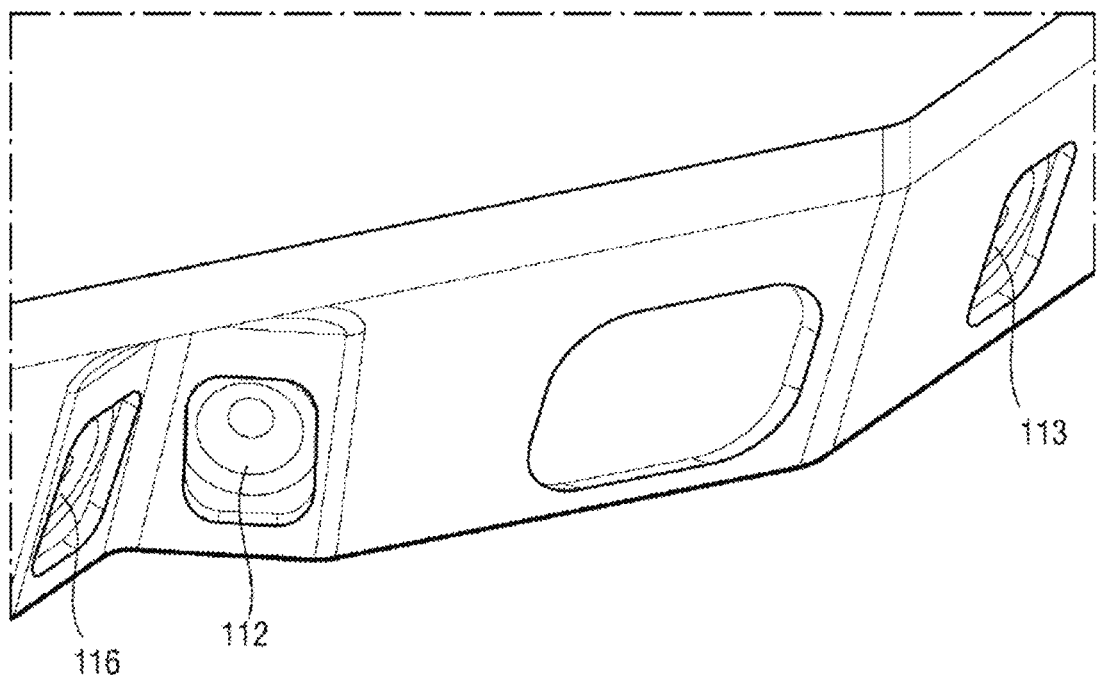
FIG. 4 is a diagrammatic view of a portion of the equipment shown in FIG. 1.

FIG. 4 thus shows one of the two blocks of equipment, with the second camera 112 and the sixth camera 116 in a concave configuration, the third camera 113 also being visible.

Seen from the pilot's point of view, the cameras are arranged from left to right as follows:
- third camera 113, which is a lateral camera pointing to the left with a field of view that is greater horizontally than vertically;
- second camera 112, which is a front camera;
- sixth camera 116, which is a lateral camera and points to the left;
- first camera 111, which is a lateral camera and points to the right;
- fifth camera 115, which is a front camera; and
- fourth camera 114, which is a lateral camera pointing to the right with a field of view that is greater horizontally than vertically.

Each front camera is thus bracketed to lie between two lateral cameras belonging to respective different sets. Furthermore, on either side of the longitudinal axis of the aircraft, there are to be found one front camera and two lateral cameras (the third, second, and sixth cameras 113, 112, and 116 on the left side, and the first, fifth, and fourth cameras 111, 115, and 114 on the right side). The two lateral cameras 113 and 116 on the left side of the aircraft both point to the left, and the two lateral cameras 111 and 114 on the right side of the aircraft both point to the right.

Thus, the cameras are distributed symmetrically relative to the longitudinal axis X of the aircraft.

In particular manner, the two front cameras 112 and 115 are offset relative to each other in elevation (but not in bearing). Thus, although the projections of the lines of sight of the two front cameras 112 and 115 onto the horizontal plane of the aircraft are parallel, the projections of the lines of sight of the two front cameras 112 and 115 onto the vertical plane of the aircraft are inclined relative to each other.

This makes it possible to increase the vertical field of view covered by the two sets 101 and 102. Typically the lines of sight of the two front cameras 112 115 are offset (in elevation but not in bearing) in the range 1° to 10°, and preferably in the range 3° to 5°.

Preferably, the projection of the line of sight of the front camera onto the longitudinal plane of the aircraft is parallel to the longitudinal axis X of the aircraft. The lines of sight of the lateral cameras are inclined relative to the longitudinal axis X of the aircraft.

The optronic equipment further comprises an electronic processor unit 103, of computer type, that is connected both to the three cameras 111, 112, and 113 of the first set 101 in order to generate a first panoramic strip 104 on the basis of the data transmitted by the three cameras 111, 112, and 113 of the first set 101, and also to the three cameras 114, 115, 116 of the second set 102 in order to generate a second panoramic strip 105 from the data transmitted by the three cameras 114, 115, and 116 of the second set 102. The processor unit 103 is arranged inside the aircraft and it is connected to an image projection device fitted to a pilot's helmet in order to project images onto a visor of the helmet in front of each of the pilot's eyes, as explained below. This type of helmet is itself known and is not described in greater detail herein.

Figure 2:
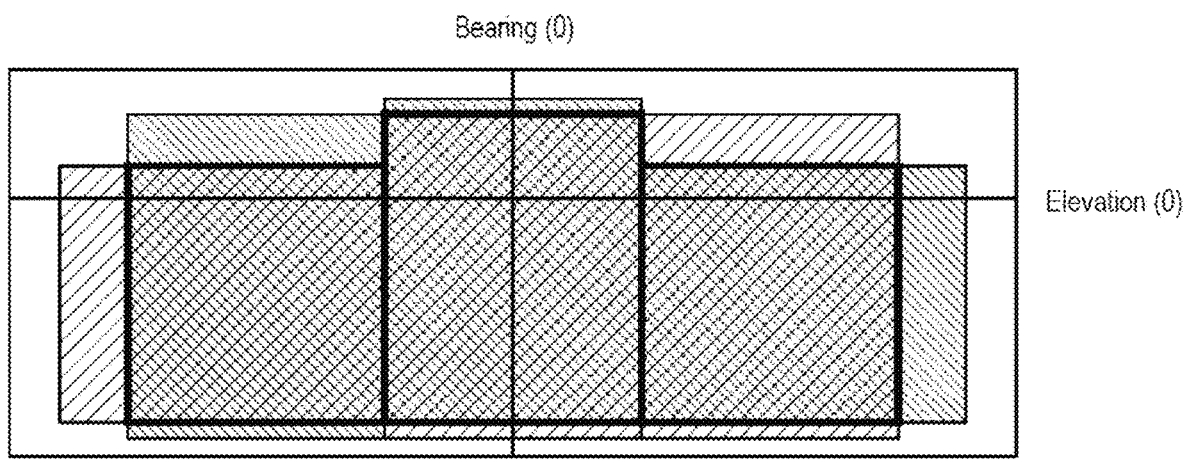
FIG. 2 is a diagram of the panoramic strip created using the equipment shown in FIG. 1.
Figure 3:
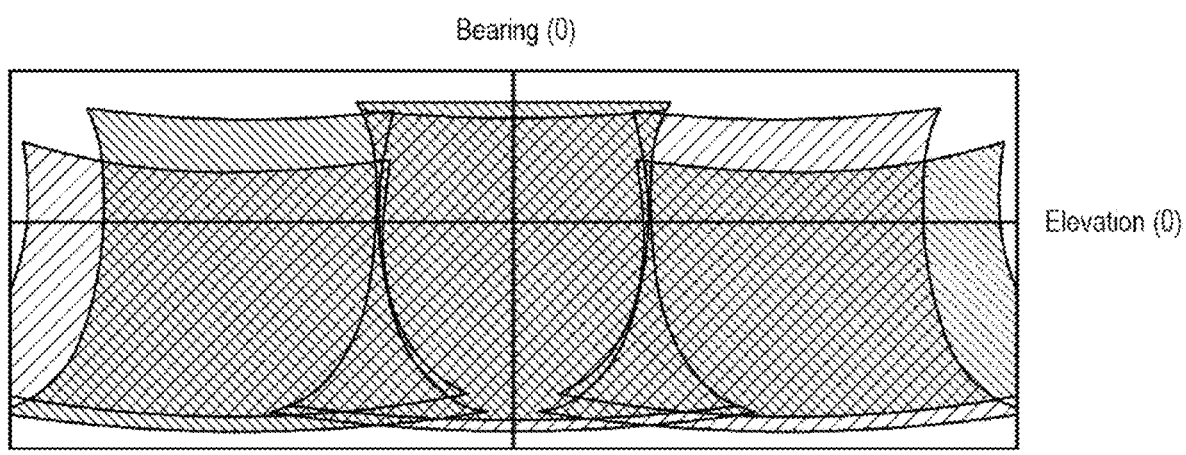
FIG. 3 is a view similar to the view of FIG. 2, taking account of the phenomena of distortion and of spherical geometry in the fields of view of the cameras of the equipment.

It is thus possible to define a general panoramic strip, as represented by the bold boxes in FIG. 2, that corresponds to superposing the first strip 104 and the second strip 105. FIG. 3 is a view that is less diagrammatic than FIG. 2, since it takes account of the distortion and the spherical geometry of the fields of view.

In the present example, FIGS. 2 and 3 are provided to facilitate understanding of the embodiment described, although in fact, and as described below, no general panoramic strip is created by the processor unit 103 or by other calculation members.

It should be observed that the first strip 104 and the second stripped 105 overlap over large vertical and horizontal extents. As a result, it is possible to project images onto the pilot's visor that provide the pilot with stereoscopic vision.

In this example, the first set 101 is associated with the user's left eye and the second set 102 is associated with the user's right eye. A view of the first strip 104 is extracted and displayed on the left side of the pilot's visor, and a view of the second strip 105 is extracted and displayed on the right side of the pilot's visor, with the pilot's brain naturally combining the two views so as to obtain a three-dimensional view.

The image seen by the pilot is thus no longer flat, but stereoscopic, coming as close as possible to natural vision.

Once again, in the present embodiment, no general strip is generated, and actually generating only the first and second strips suffices to enable the pilot to have stereoscopic vision by associating each eye with a respective one of said strips.

As mentioned above, the various cameras of the first and second sets 101 and 102 are preferably arranged in such a manner that the first and second strips 104 and 105 overlap as much as possible in order to have a stereoscopic field of view that is as large as possible.

Advantageously, if one of the sets fails, the other set continues to display images on the pilot's visor (but not in three dimensions). Typically, the same images are displayed on the right and left sides of the visor, or else the images are displayed on only one side of the visor.

The second embodiment as described in this way serves to provide redundancy. It should thus be observed that each set 101 and 102 is entirely capable of operating on its own without the other set. Thus, the loss of one of the sets 101 or 102 does not correspond to losing half the field of view, but only to losing stereoscopic vision, since the field of view is substantially identical from one set to the other.

Preferably, the cameras are located in such a manner as to comply with a specified interpupillary distance between the redundant cameras (i.e. a specified distance between the apertures or the lines of sight of the cameras under consideration).

The interpupillary distance d1 between the two front cameras is preferably greater than 250 millimeters (mm).

In the same manner, the interpupillary distance d2 between the two lateral cameras pointing to the right and the interpupillary distance d3 between the two lateral cameras pointing to the left are likewise greater than 250 mm. In the present example, the interpupillary distances d2 and d3 are the same for the cameras pointing to the right and for the cameras pointing to the left. The lateral interpupillary distance d2, d3 is substantially 280 mm.

Preferably, the front interpupillary distance d1 is greater than the lateral interpupillary distance d2, d3. Typically, the front interpupillary distance d1 is greater than 350 mm, and preferably greater than or equal to 400 mm.

In service, the cameras transmit their data to the processor unit 103, which generates the first strip 104 and the second strip 105 of the basis of that data. Depending on the position of the user's helmet, the processor unit 103 extracts corresponding right and left views from the strips and displays them in the user's helmet.

Advantageously, it is thus possible for multiple users to make use of the optronic equipment by extracting as many independent views as there are users from the strips.

This embodiment thus provides stereoscopic vision with a very good resolution over a field of view that is large both horizontally and vertically, and does so with only six cameras.

The inventors have thus been able to obtain a prototype having a field of view that is substantially 180° by 90° (to within plus or minus 5° for the 180° horizontal field of view and to within plus or minus 2° for the 90° vertical field of view) and with resolution lying in the range 1 milliradian (mrad) to 1.5 mrad.

Naturally, this application is not limiting. The equipment in a particular embodiment of the invention can thus be designed to be capable of having an overall field of view that is substantially 240° by 90° (to within plus or minus 5° for the 240° horizontal field of view and to within plus or minus 2° for the 90° vertical field of view) and with minimum resolution of 1.1 mrad. The stereoscopic portion of this field is substantially 205° horizontally (to within plus or minus 5°) by 69° vertically (to within plus or minus 2°) at the sides, and by 90° vertically (to within plus or minus 2°) in front.

Naturally, the invention is not limited to the above description, and variant embodiments may be provided without going beyond the ambit of the invention as defined by the claims.

In particular, although in the various embodiments described, the cameras are of the LWIR type, the cameras could naturally be different, and they could be of cooled type, of uncooled type, of medium waveband infrared (MWIR) type, . . . In the same manner, the optronic equipment could operate in ranges of the electromagnetic spectrum other than the infrared range. In a variant or in addition, the optronic equipment could operate in the visible range, the ultraviolet range, . . . The cameras should then be of corresponding type. Within a given set, or from one set to another, the cameras need not be identical with one another.

Although only one camera in each set is turned relative to the other two, a greater number of cameras could be turned so as to have a field of view that is greater horizontally than vertically.

Although all six cameras are connected to a single processor unit, each set could be connected to a dedicated processor unit, with each control unit then generating the panoramic strip of the associated set. In the event of failure of one of the camera sets, provision can be made to display only the panoramic strip supplied by the camera set that has not failed (the user's left eye and right eye would then see the same image strip). If necessary, provision could also be made for each of the two processor units to be able to communicate with both of the camera sets: thus in the event of one of the processor units being lost, the other could continue to generate the respective panoramic strips for each of the sets. The processor units would thus be redundant. By way of example, each of the processor units could be incorporated in a housing containing the cameras of the associated set.

Although above, each camera set is associated with a respective one of the user's eyes in order to have a right channel and a left channel, both sets could be associated with both eyes. A single view would then be projected onto the visor, thereby combining the two sets. By way of example, a general panoramic strip could be generated from the strips generated for each of the sets, and a view could be extracted for protecting on the visor (the strips generated for each of the sets could be generated individually and then associated with each other, or they could be generated so as to be incorporated directly in the general panoramic strip).

The arrangement of the cameras could be different from that stated above. For example, for reasons of arrangement, of size, . . . , it might thus be preferable to have the cameras arranged in convex manner and not in concave manner as stated above. Thus, the cameras of the first set could all be on one side, and the cameras of the second set could all be on the other side.

The two sets of could be arranged in such a manner that the first and second strips overlap entirely, so as to have a stereoscopic field of view that is as large as possible, or they could overlap in part only, so as to enlarge the overall field of view.

When the aircraft is fitted with a plurality of camera sets distributed all around it (e.g. two front sets as described above, and two sets arranged at the rear, and possibly also two sets arranged on either side of the aircraft), the processor unit should be arranged to cause images to be displayed that come from the cameras that are positioned on the aircraft in the pilot's direction of gaze. The pilot's direction of gaze should be estimated as a function of the direction in which the pilot's helmet is facing relative to the cockpit of the aircraft. As examples for detecting the direction in which the helmet is facing relative to the cockpit of the aircraft, the helmet may be fitted with an inertial unit for detecting the direction in which the helmet is facing in three-dimensional space (it then being possible to determine the direction in which the helmet is facing relative to the cockpit by also knowing the direction of the aircraft in three-dimensional space as determined by the inertial unit of the aircraft), or the cockpit may be fitted with cameras for detecting optical targets on the helmet and thus enabling the direction in which the helmet is facing relative to the cockpit to be determined.

The invention can be used with any display device connected to the processor unit 103. Instead of having a device for projecting onto the visor of the pilot's helmet, the pilot's helmet may have two displays, each arranged in front of a respective one of the pilot's eyes in order to display the panoramic strips.

The invention can be used with any type of air, land, or water vehicle.

The invention claimed is:

1. Optronic equipment for assisting with piloting a vehicle, the equipment including a first set of three cameras arranged on the vehicle to generate a first panoramic strip from data transmitted by the three cameras of the first set and a second set of three cameras arranged on the vehicle to generate a second panoramic strip from data transmitted by the three cameras of the second set, at least one of the cameras that occupies an extreme lateral position on the vehicle relative to the cameras of the first and second sets being arranged so as to have a field of view that is greater horizontally than vertically, the first set and the second set being arranged so that the first strip and second strip overlap at least in part in order to provide stereoscopic vision to the pilot, each set being capable of operating on its own, without the other set, so that in case of the loss of one of the sets, the other set is still capable to restitute a flat image to the pilot, wherein the cameras are stationary relative to the vehicle.

2. The equipment according to claim 1, wherein only two cameras of the six cameras in the two sets are arranged so as to have a field of view that is greater horizontally than vertically.

3. The equipment according to claim 2, wherein the two cameras are the cameras bracketing the other four cameras.

4. The equipment according to claim 1, wherein at least two contiguous cameras are arranged in a concave configuration.

5. The equipment according to claim 4, wherein the two cameras arranged at the center of the six cameras are crossed so that a first camera of the first set and a first camera of the second set are arranged in a concave configuration and so that a second camera of the first set and a second camera of the second set are also arranged in a concave configuration.

6. The equipment according to claim 1, wherein two cameras belonging to respective different sets are offset relative to each other in elevation.

7. The equipment according to claim 1, comprising an electronic processor unit connected to the cameras and arranged to form at least one image from the two image strips.

8. The equipment according to claim 7, wherein the image formed from the two image strips is a wide-field image.

9. The equipment according to claim 1, comprising an electronic processor unit connected to the cameras and arranged to display the two image strips in stereoscopic manner.

10. The equipment according to claim 1, wherein the cameras of the first set are powered by a first power supply, and the cameras of the second set are powered by a second power supply that is independent of the first power supply.

11. The equipment according to claim 1, including at least one block in which the cameras are arranged.

12. The equipment according to claim 1, wherein the cameras operate in the infrared range.

13. The equipment according to claim 1, wherein the cameras are of the LWIR type.

14. The equipment according to claim 1, wherein the cameras are not cooled.

15. The equipment according to claim 1, comprising a processor unit connected to the cameras and to a helmet fitted with a device for displaying an image visible to the eyes of the pilot wearing the helmet.

16. Optronic equipment for assisting with piloting a vehicle, the equipment including a first set of three cameras arranged on the vehicle to generate a first panoramic strip from data transmitted by the three cameras of the first set and a second set of three cameras arranged on the vehicle to generate a second panoramic strip from data transmitted by the three cameras of the second set, at least one of the cameras that occupies an extreme lateral position on the vehicle relative to the cameras of the first and second sets being arranged so as to have a field of view that is greater horizontally than vertically, wherein each set of the first set of three cameras and the second set of three cameras is capable of operating on its own without the other set, and thus the loss of one of the sets does not correspond to losing half the field of view, wherein the cameras are stationary relative to the vehicle.

* * * * *